United States Patent
Klein

(10) Patent No.: US 7,376,669 B2
(45) Date of Patent: *May 20, 2008

(54) SYSTEM FOR AUTOMATICALLY INITIATING A COMPUTER SECURITY AND/OR SCREEN SAVER MODE

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 349 days.

This patent is subject to a terminal disclaimer.

(21) Appl. No.: 10/102,215

(22) Filed: Mar. 19, 2002

(65) Prior Publication Data

US 2002/0099960 A1 Jul. 25, 2002

Related U.S. Application Data

(63) Continuation of application No. 09/037,361, filed on Mar. 9, 1998, now Pat. No. 6,367,020.

(51) Int. Cl.
*G06F 15/00* (2006.01)
(52) U.S. Cl. .............. 707/104.1; 707/9; 715/862; 715/867; 726/27; 726/28
(58) Field of Classification Search .............. 348/4, 348/9, 23, 25, 30, 49, 156, 634; 709/229; 713/182, 185, 200, 202, 310, 323; 707/104.1, 707/9; 726/27–28
See application file for complete search history.

(56) References Cited

U.S. PATENT DOCUMENTS

| | | | |
|---|---|---|---|
| 4,947,765 A | 8/1990 | Biedess | 109/6 |
| 5,007,085 A | 4/1991 | Greanias et al. | 380/25 |
| 5,355,414 A * | 10/1994 | Hale et al. | 726/34 |
| 5,377,269 A | 12/1994 | Heptig et al. | 380/25 |
| 5,408,536 A | 4/1995 | Lemelson | 382/2 |
| 5,471,616 A | 11/1995 | Johnson et al. | 395/700 |
| 5,548,764 A | 8/1996 | Duley et al. | 395/750 |
| 5,555,376 A | 9/1996 | Theimer et al. | 395/200.09 |
| 5,574,424 A | 11/1996 | Nguyen | 340/426 |
| 5,574,786 A | 11/1996 | Dayan et al. | 380/4 |
| 5,629,981 A | 5/1997 | Nerlikar | 380/25 |
| 5,699,104 A | 12/1997 | Yashinobu | 348/5.5 |
| 5,752,044 A | 5/1998 | Crump et al. | 395/750 |
| 5,835,083 A | 11/1998 | Nielsen et al. | 345/21 |
| 5,848,231 A | 12/1998 | Teitelbaum et al. | 395/186 |
| 5,887,131 A | 3/1999 | Angelo | 395/188.01 |
| 5,892,856 A | 4/1999 | Cooper et al. | 382/291 |

(Continued)

*Primary Examiner*—Sam Rimell
*Assistant Examiner*—Mellissa M. Chojnacki
(74) *Attorney, Agent, or Firm*—Dorsey & Whitney LLP

(57) ABSTRACT

A system for automatically switching a computer to a password protected screen saver mode when a computer user leaves the proximity of the computer. The system includes a proximity sensor that determines whether or not an individual is located proximate the computer. The proximity sensor interfaces with either the computer a bus bridge, a keyboard controller, a keyboard, or some another component of the computer to cause the computer to start executing a screen saver program responsive to an output signal from the proximity sensor. A variety of proximity sensors may be used, including ultrasound, infrared, or electromagnetic proximity sensors. A proximity sensor may also detect the presence of the computer user by detecting the weight of the user at a location proximate the computer.

27 Claims, 5 Drawing Sheets

U.S. PATENT DOCUMENTS

| | | | |
|---|---|---|---|
| 5,949,882 A | 9/1999 | Angelo | 380/25 |
| 5,959,530 A | 9/1999 | Lupien, Jr. et al. | 340/568.1 |
| 5,960,085 A | 9/1999 | de la Huerga | 380/25 |
| 5,983,273 A | 11/1999 | White et al. | 709/229 |
| 5,986,549 A | 11/1999 | Teodorescu | 340/561 |
| 6,002,427 A | 12/1999 | Kipust | 348/156 |
| 6,070,240 A | 5/2000 | Xydis | 713/200 |
| 6,088,450 A | 7/2000 | Davis et al. | 713/182 |
| 6,189,105 B1 | 2/2001 | Lopes | 713/202 |
| 6,282,655 B1 | 8/2001 | Given | 713/200 |
| 6,308,272 B1 | 10/2001 | Pearce | 713/200 |
| 6,401,209 B1 | 6/2002 | Klein | 713/200 |

\* cited by examiner

SYSTEM FOR AUTOMATICALLY INITIATING A COMPUTER SECURITY AND/OR SCREEN SAVER MODE

CROSS-REFERENCE TO RELATED APPLICATIONS

This application is a Continuation application of pending U.S. patent application Ser. No. 09/037,361, filed Mar. 9, 1998.

TECHNICAL FIELD

This invention relates to computers, and more particularly to a system for causing a computer to automatically switch to a screen saver and/or secure operating mode when a computer user leaves the computer.

BACKGROUND OF THE INVENTION

Computers, and, more particularly, personal computers, are in widespread use in the home and workplace. Such computers are commonly used to record or process information that the user of the computer desires to maintain confidential. Confidential information present in a computer is typically maintained confidential by placing the computer in a password protected "screen saver" mode. Once the computer has transitioned from a normal operating mode to the password protected screen saver mode, information recorded in the computer can be accessed only after the correct password has been entered by typing the password on a keyboard of the computer. If only authorized users of the computer know the password, the confidential information will be accessible only to authorized users.

Computers typically automatically switch from the normal operating mode to the password protected screen saver mode after a predetermined period has elapsed since an input device for the computer was last manipulated. Thus, if a user stops using the computer for the predetermined period, the computer automatically switches to the password protected screen saver mode. Generally, the user sets the predetermined period that must lapse before the computer transitions to the screen saver mode. The user may also generally switch the computer to the password protected screen saver mode by pressing a predetermined combination of keys on the keyboard.

Although computers that are capable of operating in the above-described password protected screen saver mode adequately safeguards confidential information in many instances, it nevertheless has several disadvantages. In particular, if the delay period set by the user to switch the computer to the screen saver mode is excessively long, the computer may be left in the normal operating mode for a considerable period after an authorized user leaves the computer. Individuals who are not authorized to receive such information may then access confidential information present in the computer. It is often difficult if not impossible to select a single delay period that will optimally safeguard confidential information. The delay period should ideally be set to correspond to the period of time that an authorized user may be present at the computer without using the computer. However, this period may vary considerably. Therefore, confidential information can normally be adequately safeguarded only by selecting a very short delay period, i.e., on the order of a few minutes. Alternatively, the computer user can manually switch the computer to the password protected screen saver mode by pressing the predetermined combination of keys on the keyboard.

Each of the above-described alternatives has serious drawbacks. Selecting a period that is short enough to adequately safeguard confidential information will often cause the computer to switch to the screen saver mode even though the authorized user is still present at the computer, particularly if the user performs other duties while present at the computer. For example, the computer may switch to the password protected screen saver mode while the user is engaging in a telephone conversation. A short delay period will therefore require the computer user to repeatedly type in the password throughout the day, possibly every time the computer is to be used. Requiring that the password be entered many times throughout the day can waste a significant amount of time, and is thus very annoying to many people.

The other alternative, i.e., relying on the user to type the predetermined combination of keys to switch the computer to the password protected screen saver mode, may fail to adequately protect confidential information. In particular, the computer user may forget to switch the computer to the screen saver mode. The computer user may also choose not to switch the computer to the screen saver mode because he or she expects to be absent from the computer for only a brief period of time. However, the computer user may greatly underestimate the amount of time that he or she will be absent from the computer. In either case, the computer is left unattended in the normal operating mode, thereby making the confidential information readily accessible to unauthorized individuals.

There is therefore a need for a method of operating a computer using a password protected screen saver in a manner that adequately protects confidential information accessible on the computer, and that does so without significantly inconveniencing authorized users of the computer.

SUMMARY OF THE INVENTION

A screen saver system causes a computer to automatically start executing a screen saver program when a computer user leaves the proximity of the computer. The screen saver program is preferably, but need not be, a password protected screen saver program. The system includes a proximity sensor mounted on or near a component of the computer for detecting whether a person is located proximate the computer. The proximity sensor generates a detection signal indicative of the person leaving the proximity of the computer. The system also includes a control circuit coupled to the proximity sensor. The control circuit switches the computer to the screen saver mode responsive to the detection signal.

Any of a variety of proximity sensors may be used including a motion detector, an ultrasound, infrared, or electromagnetic proximity sensor. The proximity of the computer user to the computer may also be detected by other means such as by using a weight sensor that detects the weight of the computer user at a predetermined location proximate the computer.

DETAILED DESCRIPTION OF THE INVENTION

Figure 1:
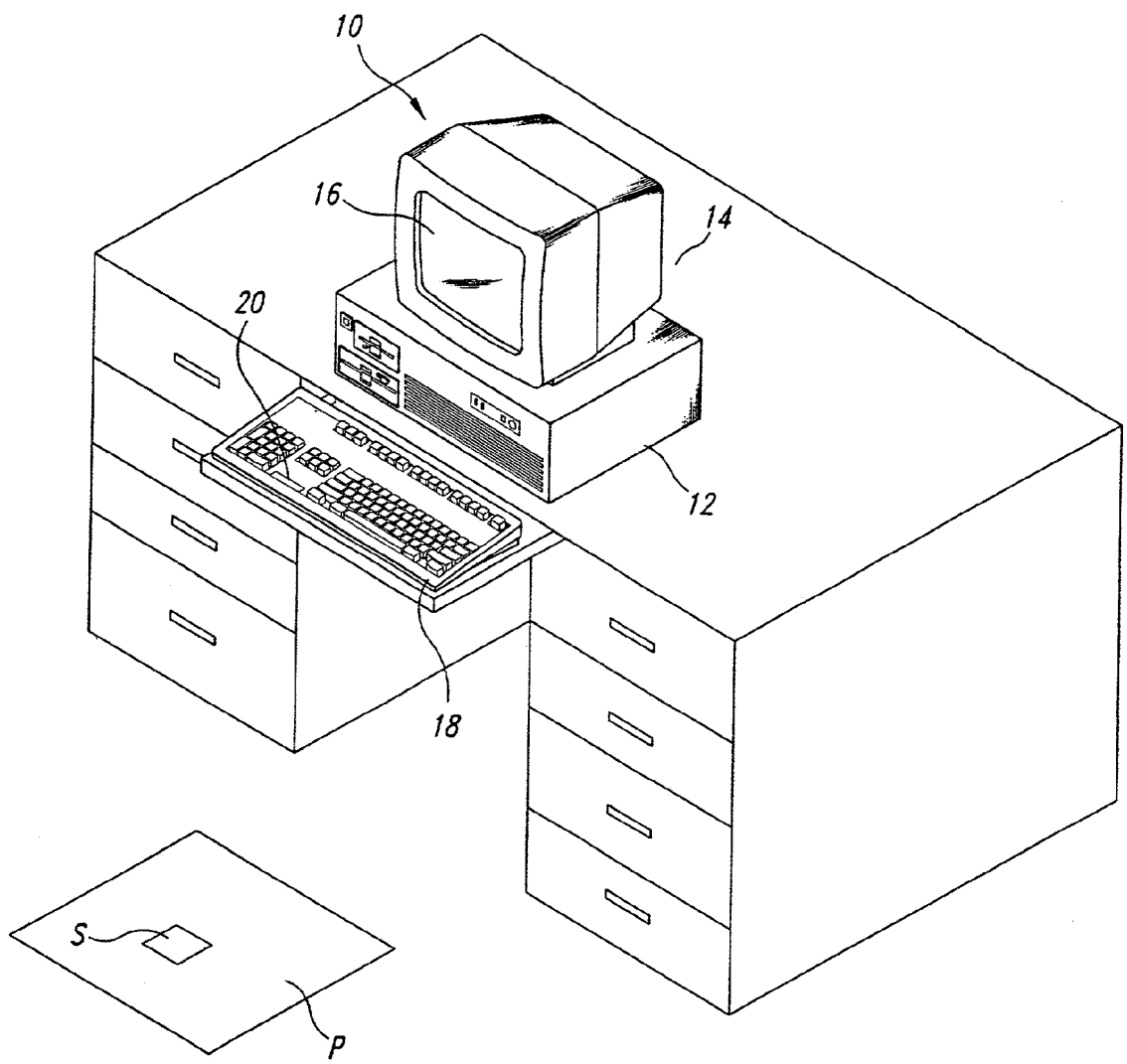
FIG. 1 is an isometric view of a computer incorporating various embodiments of the inventive electronic system in which the computer is positioned on a desk proximate a workspace that may be occupied by an individual.

One embodiment of the invention is shown in FIG. 1 in which a computer 10 is placed on the top of a desk D. A workspace W positioned behind the desk D is sometimes occupied by a computer user. Thus, when the computer user is at the workspace W, the user is positioned proximate the computer 10. The workspace W may also include a floor pad P adapted to support a chair on which the computer user may sit while occupying the workspace W to work on the computer 10.

The computer 10 includes a computer chassis 12 of conventional design, a conventional cathode ray tube ("CRT") monitor 14 having a CRT screen 16, and a conventional keyboard 18, all of which are placed on the desk D. The keyboard 18 also contains a proximity sensor 20 that detects whether or not the computer user is present at the workspace W proximate the computer 10. However, in different embodiments, the proximity sensor could alternatively be mounted in the chassis 12, monitor 14, or any other location that is proximate the user operating the computer 10. Also, the computer 10 could have different components, such as a mouse or other pointing device (not shown) or a unitary chassis, keyboard, and display as in a laptop computer (not shown).

The computer 10 operates in accordance with an operating system, such as a windows-based operating system like Microsoft Windows® operating system. A number of applications programs, such as a word processor, spreadsheet, database, etc., will also be installed on the computer 10. The operating system will generally include a "screen saver" program, although a separate "screen saver" application program may also be loaded on the computer 10. In either case, the "screen saver" program causes a stationary or moving image to be displayed on the screen 16 of the monitor 14 in place of an image that would otherwise be displayed by the operating system or currently executing application program. The "screen saver" normally starts running automatically after a user selectable period of time has elapsed since an input device, e.g., the keyboard 18, was actuated by the computer user. However, the user may manually cause the computer 10 to start executing the screen saver program by pressing a predetermined combination of keys on the keyboard 18, such control, shift, and function "F" keys.

The screen saver program, whether a part of the operating system or an application program, can generally operate in either of two modes, namely an unprotected mode or a password protected mode. In the unprotected mode, the computer 10 stops executing the screen saver program whenever the computer user manipulates an input device, such as the keyboard 18. The computer 10 then resumes executing whatever program it was executing when the computer 10 started executing the screen saver program. In the password-protected mode, the screen saver does not stop executing the screen saver program unless the computer user correctly types in a secret password. If the user types the correct password, the computer 10 will discontinue executing the screen saver program and resume executing whatever program it was executing when the computer 10 started executing the screen saver program. If the user is unable to type the correct password, the computer 10 will not execute any application program regardless of what keys are pressed or other action is taken by the user. Although the various embodiments of the invention may be used with a screen saver program operating in either the unprotected mode or the password protected mode, it is most valuable when the screen saver program is operating in the password protected mode.

As explained above, computer users often unintentionally leave their workstations with their computers executing an applications program for a variety of reasons. Whatever the reason, leaving a computer 10 unattended without switching it to a password protected screen saver mode can result in disclosure of confidential information to unauthorized individuals. If the computer user does enable the computer to automatically switch to the password protected screen saver mode, the computer user may be required to repetitively enter the password throughout the day, even though the computer user may have never left the workstation.

None of the above-described situations is desirable, and the various embodiments of the invention are directed to solving all or some of these problems. In particular, the computer 10 shown in FIG. 1 avoids the above-described problems by using the proximity sensor 20 to determine whether or not the individual is present at the workspace W proximate the computer 10. If the individual is present at the workspace W, the computer 10 continues to execute the operating system or application program without executing the screen saver program. When the individual leaves the workspace W, the proximity sensor 20 detects the absence of the individual from the workspace W and causes the computer 10 to execute the screen saver, either immediately or after a predetermined delay. Alternatively, the computer 10 may begin executing the screen saver before the user leaves the workspace W, but it does not operate in a password protected mode until the proximity sensor 20 detects that the user has left the workspace W.

The proximity sensor 20 may be any of a variety of conventional or subsequently developed proximity sensors. For example, the proximity sensor 20 may broadcast sound (ultrasound or at another frequency), light (infrared or at another wavelength), electromagnetic energy, etc., and detect whether or not the sound, light, electromagnetic energy, etc. is reflected from an individual present at the workspace W. The proximity sensor 20 may detect the presence of the individual at the workspace W either directly or by detecting movement of the individual at the workspace W. Proximity sensors 20 other than reflective proximity sensors mounted on or near the keyboard 18 or other component of the computer 10 may also be used. For example, a weight sensor S (FIG. 1) placed under the floor pad P may be used to detect the presence of the individual sitting in a chair on the floor pad P. Thus, the term "proximity sensor" is intended to encompass any device that determines whether or not the individual is proximate the computer 10.

Figure 2:
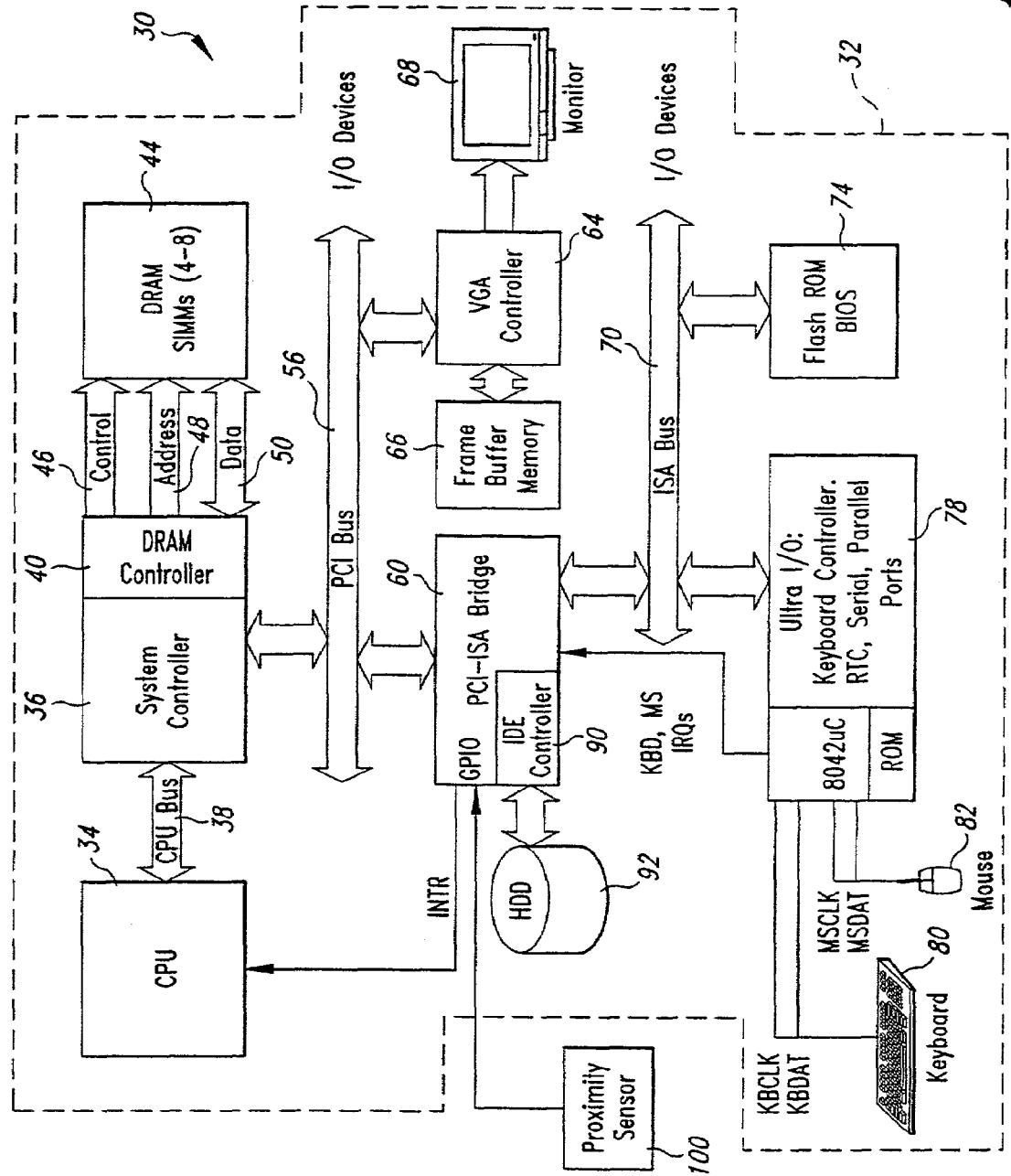
FIG. 2 is a block diagram and schematic of an electronic system according to one embodiment of the invention in which a computer interfaces with a proximity sensor through a PCI-ISA bus bridge.

One embodiment of an electronic password protected screen saver system 30 that may operate according to one embodiment of the invention is illustrated in FIG. 2. Most of the system shown in FIG. 2 is conventional. The system 30 includes a conventional computer system 32 including a CPU 34 coupled to a system controller 36 through a CPU bus 38. The system controller 36 includes a DRAM controller 40 that couples the CPU 34 to a dynamic random access memory ("DRAM") 44 through a control bus 46, an address bus 48, and a data bus 50. The system controller 36 also couples the CPU 34 to peripheral complement interconnect ("PCI") bus 56. The PCI bus 56 may be coupled to a variety of input output ("I/O") devices as well as to a PCI-bus bridge 60. The PCI bus 56 is also coupled to a video graphics accelerator ("VGA") controller 64 that interfaces with both a frame buffer memory 66 and cathode ray tube ("CRT") monitor 68. As is well known in the art, the PCI bus 56 is a relatively high-speed bus, and, in conjunction with a VGA controller 64, allows the CRT monitor 68 to display video graphics at a relatively high rate. At the same time, the frame buffer memory 66 stores most of the video data displayed on the CRT monitor 68 so that the PCI bus 56 needs to provide video data to the VGA controller 64 only when corresponding pixels of the video images change. As a result, the VGA controller 64 and the frame buffer memory 66 minimize the burden on the PCI bus 56.

As mentioned above, the PCI bus 56 is coupled to a PCI-ISA bus bridge 60, which couples the PCI bus 56 to an industry standard architecture ("ISA") bus 70. As is well known in the art, the ISA bus 70 is relatively slow compared to the PCI bus 56. The ISA bus 70 is also connected to various I/O devices such as flash read-only memory ("ROM") basic input/output system ("BIOS") memory 74 and a conventional controller 78 that interfaces with a keyboard 80 and a mouse pointing device 82.

The PCI-ISA bus bridge 60 also includes an integrated device electronics ("IDE") controller 90 that is coupled to a fixed disk drive 92 for the mass storage of data.

As is well known in the art, the operating system stored on the hard disk drive 92 may include screen saver software. The screen saver software causes a screen saver image to be displayed on the CRT monitor 68, typically after the computer system 32 has been idle for more than a pre-determined period. However, screen savers operating in a conventional computer system 32 of the type shown in FIG. 2 exhibit the problems described above. Specifically, computer system 32 may fail to switch to the screen saver mode soon enough after the operator leaves the proximity of the computer system 32. Also, the computer system 32 may repeatedly switch to the screen saver mode throughout the day even though the operator remains in the proximity of the computer system 32. The operator is thus required to repeatedly enter a screen saver password to use the computer throughout the day. The embodiment of the system 30 shown in FIG. 2 avoids these problems by using a proximity sensor 100 that is coupled to a general purpose input port ("GPIO") conventionally included in the PCI-ISA bus bridge 60. The CPU 34 is programmed to periodically poll the proximity sensor 100 through the PCI-ISA bus bridge 60. The proximity sensor 100 may be polled as frequently as each second or faster using a time base provided by a system clock (not shown) included in the computer system 32. They operating system stored on the hard disk drive 92 is programmed to forego initiating the screen saver mode unless polling of the proximity sensor 100 indicates that an operator is no longer present in the proximity of the computer system 32. If the operator leaves the proximity of the computer system 32, the proximity sensor 100 detects his or her absence. When the CPU 34 subsequently polls the proximity sensor 100, the CPU 34 switches the computer system 32 to the screen saver mode either immediately or after a pre-determined time. In the later case, if the operator returns to the proximity of the computer system 32 during this pre-determined period, the computer system 32 is inhibited from switching to the screen saver mode.

Figure 3:
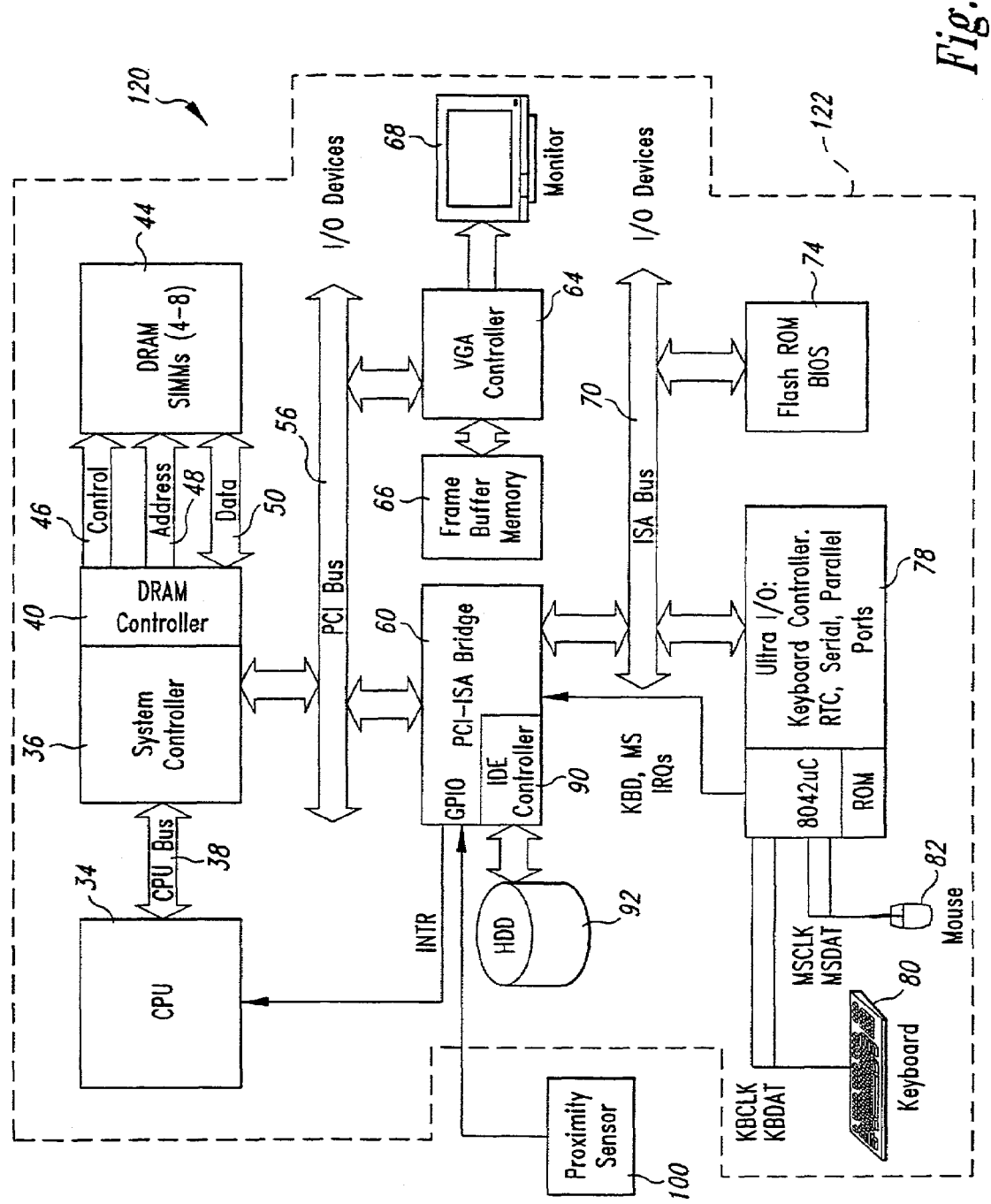
FIG. 3 is a block diagram and schematic of an electronic system according to another embodiment of the invention in which a computer interfaces with a proximity sensor through a keyboard interface microcontroller.

An alternative the embodiment of a system 120 for automatically initiating a screen saver mode is illustrated in FIG. 3. The system 120 includes a conventional computer system 122 containing many of the same components that are in the computer system 32 of FIG. 2. Therefore, in the interest of brevity, these components have been provided with the same reference numerals, and an explanation of their structure and operation will not been repeated.

In the system of 120 of FIG. 3, the proximity sensor 100 is coupled to the keyboard interface microcontroller 78 through a general-purpose input port conventionally included in the microcontroller 78. The proximity sensor 100 is polled as frequently as each second or faster using a time base conventionally provided in the keyboard controller 78. Alternatively, the proximity sensor 100 may be polled as the controller repeatedly executes an internal software loop. When the keyboard controller 78 detects a signal from the proximity sensor 100 indicating the presence of an operator in the proximity of the computer system 122, the keyboard controller 78 initiates a code sequence that simulates activation of a key on the keyboard 80. For example, the code sequence may simulate a null key press (e.g., a "shift key"). Activation of a null key does not generally perform any function in an applications program being executed in the computer system 122. However, screen saver programs are typically programmed to inhibit switching to a screen saver mode for a pre-determined time after any keystroke. Thus, when the keyboard controller 78 initiates a code sequence simulating a key press, the computer system 122 is inhibited from entering the screen saver mode. Using this embodiment, the parameters of the screen saver program can be set to provide a very short delay time to enter the screen saver mode after the computer system 122 has become idle.

Figure 4:
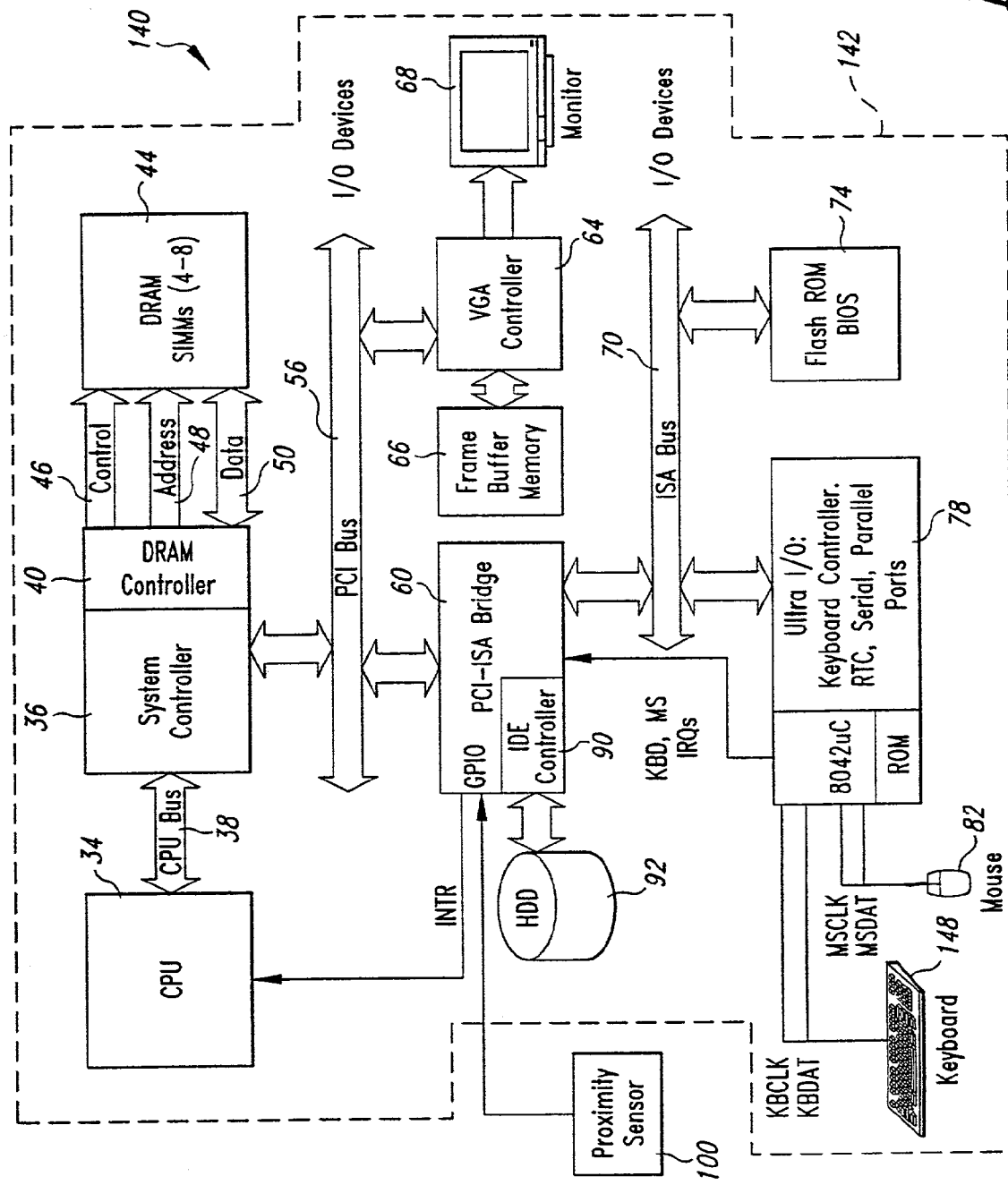
FIG. 4 is a block diagram and schematic of an electronic system according to still another embodiment of the invention in which a computer interfaces with a proximity sensor through a keyboard.

Still another embodiment of a system 140 for automatically initiating a screen saver mode is illustrated in FIG. 4. The system 140 also includes a conventional computer system 142 containing many of the same components that are in the computer system 32 of FIG. 2, which have been provided with the same reference numerals. The proximity sensor 100 is coupled directly to a specially configured keyboard 148. The keyboard interface microcontroller 78 polls the keyboard 148 through the general-purpose input port in the microcontroller 78. The proximity sensor 100 is polled as frequently as each second or faster each time the software controlling the operation of the keyboard interface microcontroller 78 passes through its normal keyboard scan routine. One advantage of the system 140 of FIG. 4 is that it can be implemented simply by replacing the keyboard 80 in a conventional computer system with the keyboard 148.

When the proximity sensor 100 provides a signal indicating the presence of an operator in the proximity of the computer system 142, the signal causes the keyboard 148 to simulate activation of a key on the keyboard 148. For example, a null key press may be simulated. As explained above, a null key press does not generally perform any function but is does inhibit the computer system 142 from switching to a screen saver mode for a predetermined time after the keystroke.

Figure 5:
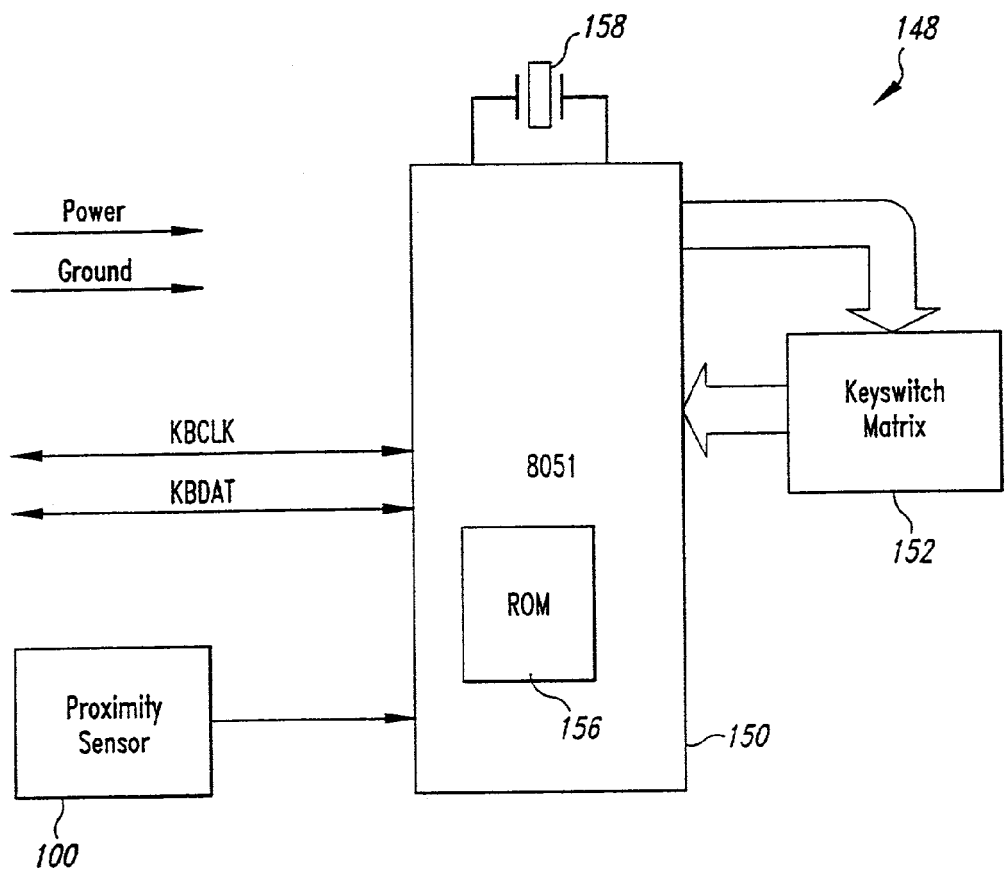
FIG. 5 is a block diagram of the keyboard of FIG. 4 showing the manner in which the proximity sensor interfaces with the keyboard.

One embodiment of a keyboard 148 usable in the system 140 of FIG. 4 is illustrated in FIG. 5. The keyboard 148 includes a conventional "8051" controller 150 coupled to a key switch matrix 152 by conventional means. A program stored in a ROM 156 within the controller 150 controls the operation of the controller 150. The controller 150 contains an internal oscillator generating a clock signal having a frequency determined by a crystal 158. The controller 150 outputs the keyboard clock signal on line KBCLK and keyboard data on line KBDAT, both of which are applied to the keyboard interface controller 78. The proximity sensor 100 is coupled to the controller 150 by conventional means. The embodiment illustrated in FIG. 5 is for a "PS/2" keyboard port. However, and "USB" peripheral port for a keyboard and mouse may also be used.

Figure 6:
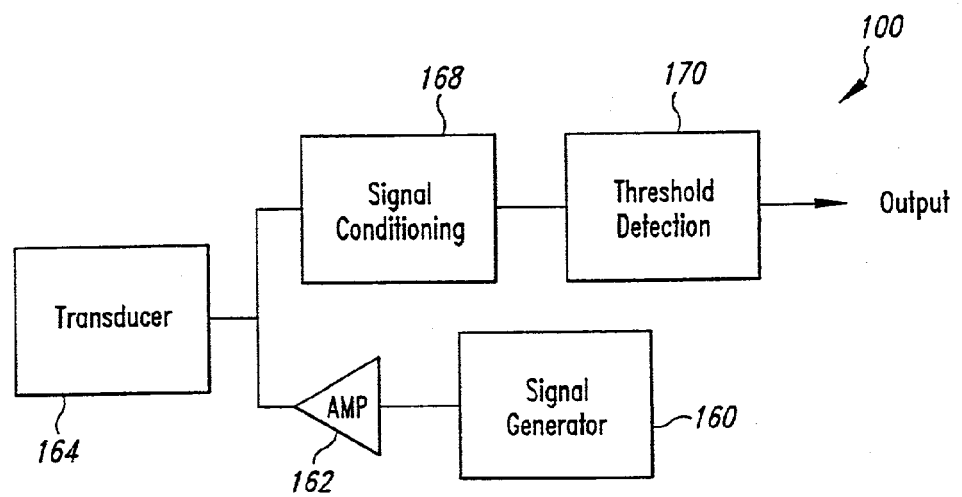
FIG. 6 is a block diagram of one embodiment of a proximity sensor that may be used in the embodiments of FIGS. 2-5.

One embodiment of a proximity sensor 100 is illustrated in FIG. 6. The proximity sensor 100 uses ultrasound reflected from the operator to detect the proximity of the operator adjacent the proximity sensor 100. The proximity sensor 100 includes a signal generator 160 producing an electrical signal having a desired frequency. The output of the signal generator 160 is boosted by an amplifier 162 of conventional design and applied to the input of a conventional ultrasound transducer 164. The transducer 164 then the generates an acoustic signal having a frequency corresponding to the frequency of the electrical signal produced by the signal generator 160. The acoustic signal reflects from objects in the proximity of the computer system, including the operator. These reflections of the acoustic signal strike the transducer 164, which then converts the reflected acoustic signal to a corresponding electrical signal. However, the electrical signal generated by the transducer 164 will mix with the electrical signal applied to the transducer 164 so that a relatively low frequency signal will be generated having a frequency equal to the difference between the electrical signal applied to the transducer 164 and the frequency of the reflected acoustic signal. As the operator moves in the proximity of the transducer 164, the frequency of the reflected acoustic signal will vary because of the Doppler effect. Therefore, if an operator is in the proximity of the proximity sensor 100, a relatively low frequency signal will be present at the output of the transducer 164. This low frequency signal is coupled through a conventional signal conditioning unit 168 that may, for example, filter the high frequency components present at the output of the transducer 164. The signal conditioning unit 168 may also convert the low frequency signal applied to the signal conditioning unit 168 to a direct current ("DC") signal having a magnitude indicative of the amplitude of the low frequency signal. The output of the signal conditioning unit 168 is applied to a threshold detection circuit 170. The threshold attention circuit 170 generates an output signal indicative of the presence of an operator adjacent the proximity sensor 100 whenever the output of the signal conditioning unit 168 exceeds a predetermined magnitude. Thus, the presence or absence of the output signal from the threshold detection circuit 170 indicates whether or not the operator is adjacent the proximity sensor 100.

It will be apparent to one skilled in the art that the components illustrated FIG. 6 may also be configured to operate differently. For example, the signal conditioning unit 168 may be configured to provide a signal indicative of changes in the amplitude of the electrical signal from the transducer 164 corresponding to the reflected acoustic signal. Other alternative designs will also be apparent to one skilled in the art.

While the invention has been described herein by way of exemplary embodiments, various modifications may be made without departing from the spirit and scope of the invention. For example, although the various embodiments of the invention have been described as an integral part of a computer, it will be understood that the invention may be embodied in a separate, stand-alone system that is connected to the computer 10. Accordingly, the invention is not limited except as by the appended claims.

The invention claimed is:

1. A computer, comprising:
   a microprocessor;
   a memory device coupled to the microprocessor, the memory device containing a screen saver program for execution by the microprocessor;
   an input device coupled to the microprocessor;
   a display device coupled to the microprocessor;
   a proximity sensor for detecting whether a person is located proximate the computer based on a presence of the person, the proximity sensor generating a detection signal indicative of whether or not the person is proximate the computer; and
   a keyboard controller coupled to the microprocessor and a keyboard, the keyboard controller further coupled to the proximity sensor to receive the detection signal therefrom, the keyboard controller configured to simulate activation of at least one key of the keyboard to prevent screen saver program from executing when the proximity sensor indicates the person is proximate to the computer.

2. The computer of claim 1 wherein the screen saver program executed by the computer requires the entry of a password before the computer is able to run an application program.

3. The computer of claim 1 wherein the controller comprises a coupling circuit coupling the proximity sensor to the microprocessor.

4. The computer of claim 1 wherein the controller comprises a keyboard included in the computer, the proximity sensor being coupled to the keyboard.

5. The computer of claim 1 wherein the control circuit comprises a bus bridge included in the computer, the proximity sensor being coupled to an input port of the bus bridge.

6. The computer of claim 1 wherein the proximity sensor comprises a motion detector that generates a detection signal indicative of whether motion is detected proximate the computer.

7. The computer of claim 1 wherein the proximity sensor comprises an infrared proximity sensor.

8. The computer of claim 1 wherein the proximity sensor comprises:
   an electromagnetic signal generator generating electromagnetic radiation in an area surrounding the computer; and
   an electromagnetic signal detector generating a detection signal indicating that the person is not in the proximity of the computer responsive to detecting electromagnetic radiation from the electromagnetic signal generator that is reflected from the person proximate the computer.

9. The computer of claim 1 wherein the proximity sensor comprises a weight sensor that detects the weight of the person at a predetermined location proximate the computer.

10. The computer of claim 1 wherein the proximity sensor comprises an ultrasound proximity sensor.

11. A system for controlling the operating mode of a computer, the system comprising:
- a proximity sensor for detecting whether a person is located proximate the computer based on a presence of the person, the proximity sensor generating a detection signal indicative of the person leaving the proximity of the computer; and
- a keyboard controller coupled to the computer and a keyboard, the keyboard controller further coupled to the proximity sensor to receive the detection signal, the keyboard controller configured to simulate activation of at least one key of the keyboard to prevent the computer from switching to a password protected mode when the proximity sensor indicates the person is proximate to the computer.

12. The system of claim 11 wherein the controller comprises a keyboard included in the computer, the proximity sensor being coupled to the keyboard.

13. The system of claim 11 wherein the controller comprises a bus bridge included in the computer, the proximity sensor being coupled to an input port of the bus bridge.

14. The system of claim 11 wherein the proximity sensor comprises a motion detector that generates the detection signal indicative of whether motion is detected proximate the computer.

15. The system of claim 11 wherein the proximity sensor comprises an infrared proximity sensor.

16. The system of claim 11 wherein the proximity sensor comprises:
- an electromagnetic signal generator generating electromagnetic radiation in an area surrounding the computer; and
- an electromagnetic signal detector generating the detection signal responsive to detecting electromagnetic radiation from the electromagnetic signal generator that is reflected from the person proximate the computer.

17. The system of claim 11 wherein the proximity sensor comprises a weight sensor that detects the weight of the person at a predetermined location proximate the computer.

18. The system of claim 11 wherein the proximity sensor comprises an ultrasound proximity sensor.

19. A system for controlling the operating mode of a computer, the system comprising:
- a proximity sensor for detecting whether a person is located proximate the computer based on a presence of the person, the proximity sensor generating a detection signal indicative of whether or not the person is proximate the computer; and
- a keyboard controller coupled to the computer and a keyboard, the keyboard controller further coupled to the proximity sensor to receive the detection signal, the keyboard controller configured to simulate activation of at least one key of the keyboard to prevent screen saver program from being executed by the computer when the proximity sensor indicates the person is proximate to the computer.

20. The system of claim 19 wherein the screen saver program executed by the computer requires the entry of a password before the computer is able to run an application program.

21. The system of claim 19 wherein the controller comprises a keyboard included in the computer, the proximity sensor being coupled to the keyboard.

22. The system of claim 19 wherein the controller comprises a bus bridge included in the computer, the proximity sensor being coupled to an input port of the bus bridge.

23. The system of claim 19 wherein the proximity sensor comprises a motion detector that generates a detection signal indicative of whether motion is detected proximate the computer.

24. The system of claim 19 wherein the proximity sensor comprises an infrared proximity sensor.

25. The system of claim 19 wherein the proximity sensor comprises:
- an electromagnetic signal generator generating electromagnetic radiation in an area surrounding the computer; and
- an electromagnetic signal detector generating a detection signal indicating that the person is not in the proximity of the computer responsive to detecting electromagnetic radiation from the electromagnetic signal generator that is reflected from the person proximate the computer.

26. The system of claim 19 wherein the proximity sensor comprises a weight sensor that detects the weight of the person at a predetermined location proximate the computer.

27. The system of claim 19 wherein the proximity sensor comprises an ultrasound proximity sensor.

* * * * *

UNITED STATES PATENT AND TRADEMARK OFFICE
CERTIFICATE OF CORRECTION

PATENT NO. : 7,376,669 B2 Page 1 of 1
APPLICATION NO. : 10/102215
DATED : May 20, 2008
INVENTOR(S) : Klein It is certified that error appears in the above-identified patent and that said Letters Patent is hereby corrected as shown below:

In column 1, line 8, after "of" delete "pending".

In column 1, line 10, after "1998" delete "." and insert -- , now Pat. No. 6,367,020. --, therefor.

In column 8, line 32, in Claim 1, after "prevent" insert -- a --.

In column 10, line 8, in Claim 19, after "prevent" insert -- a --.

Signed and Sealed this

Ninth Day of September, 2008

JON W. DUDAS
*Director of the United States Patent and Trademark Office*